United States Patent Office 2,808,411
Patented Oct. 1, 1957

2,808,411

4-SUBSTITUTED 1.2-DIARYL-3.5-DIOXO-PYRAZOLIDINES

Rolf Denss and Franz Häfliger, Basel, Switzerland, assignors to Geigy Chemical Corporation, New York, N. Y., a corporation of Delaware No Drawing. Application May 25, 1956,
Serial No. 587,216

Claims priority, application Switzerland June 10, 1955

3 Claims. (Cl. 260—295)

The present invention concerns 4-substituted 1.2-diaryl-3.5-dioxo-pyrazolidines which can be used therapeutically.

1.2-diphenyl-3.5-dioxo-4-n-butyl pyrazolidine has attained great importance as a therapeutic for the treatments of rheumatic complaints. On the other hand, 1.2-diaryl-3.5-dioxo-pyrazolidines substituted in the 4-position by an acyl radical of a heterocyclic carboxylic acid have not been known up to now; that such compounds could be produced at all could not have been foreseen.

Surprisingly it has now been found that compounds of the general formula:

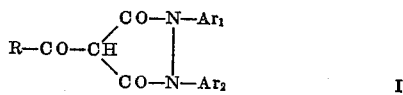
I or the tautomeric forms thereof wherein Ar₁ and Ar₂ each represent a member selected from the group consisting of phenyl, lower alkylphenyl and lower alkoxyphenyl radicals, and R represents a member selected from the group consisting of 3-pyridyl and 4-pyridyl radicals, can be easily produced if a reactive functional derivative of a pyridine-3- or -4-carboxylic acid is reacted, if necessary in the presence of a condensing agent, with a malonyl hydrazobenzene of the general formula:

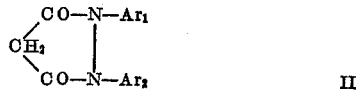
II wherein Ar₁ and Ar₂ have the meaning defined above.

For example, a pyridine-3- or -4-carboxylic acid halide or anhydride can be reacted in the presence of pyridine or another tertiary organic base with a malonyl hydrazobenzene of the general Formula II or a pyridine-3- or -4-carboxylic acid ester can be reacted with the malonyl hydrazobenzene in the presence of an alkali metal alcoholate.

The reactions with acid halides are advantageously performed in inert solvents such as, e. g. benzene. Reactions with acid esters can be performed for example in alcohols having a suitable boiling point or also in inert organic solvents.

Besides malonyl hydrazobenzene, also o-methyl, p-methyl, p.p'-dimethyl, p.p'-bis-tertiary butyl, p-methoxy and p.p'-diethoxy malonyl hydrazobenzene are examples of starting materials of the general Formula II.

The new 1.2-diaryl-3.5-dioxo-4-acyl pyrazolidines are mostly colourless crystallised compounds. They form salts with inorganic and organic bases, some of which are difficultly soluble.

The new compounds have an excellent antiphlogistic and antipyretic action. Of particular value are the derivatives of pyridine-4-carboxylic acid, e. g. the 1.2-diphenyl- or 1.2-di-p-tolyl- isonicotinoyl-3.5-dioxo-pyrazolidine. They may be used, e. g. for the treatment of rheumatic diseases such as rheumatoid arthritis and acute gout. When administered perorally, e. g. in the form of tablets or coated tablets, 0.1 to 1.5 g. per day are sufficient. They may, however, also be given parenterally, e. g. by injection of aqueous solution of the sodium salts or the dimethylaminoethanol or diethylaminoethanol salts.

The following example further illustrates the production of the new compounds. Parts are given as parts by weight and their relationship to parts by volume is as that of grammes to cubic centimetres.

*Example*

50.4 parts of malonyl hydrazobenzene in 100 parts by volume of pyridine and 400 parts by volume of benzene are added under ice cooling to 35.6 parts of isonicotinic acid chloride hydrochloride in 50 parts by volume of pyridine. The whole is left to stand for some time at room temperature, then filtered under suction and the difficultly soluble reaction product is washed with benzene. The 1.2-diphenyl - 4 - isonicotinoyl-3.5-dioxopyrazolidine so obtained melts, after repeated stirring with water and alcohol, at 341–342°.

The following compounds can be produced in a manner analogous to that described in the above example:

1.2 - diphenyl - 4 - nicotinoyl - 3.5 - dioxo - pyrazolidine, M. P. 338–341°

1.2-di-p-tolyl-4-nicotinoyl-3.5-dioxo-pyrazolidine, M. P. 318–322°

1.2 - di - p - methoxyphenyl - 4 - isonicotinoyl - 3.5-dioxo-pyrazolidine, and 1.2-di-p-tolyl-4-isonicotinoyl-3.5-dioxo-pyrazolidine

What we claim is:

1. A 4-substituted 1.2-diaryl-3.5-dioxo-pyrazolidine corresponding to the formula:

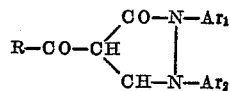

wherein Ar₁ and Ar₂ each represent a member selected from the group consisting of phenyl, lower alkylphenyl and lower alkoxyphenyl radicals, and R represents a member selected from the group consisting of 3-pyridyl and 4-pyridyl radicals.

2. 1.2-diphenyl-4-isonicotinoyl-3.5-dioxo-pyrazolidine.

3. 1.2 - di- p - tolyl - 4 - isonicotinoyl-3.5-dioxo-pyrazolidine.

References Cited in the file of this patent

FOREIGN PATENTS 506,891    Belgium _____ Nov. 30, 1951